(12) United States Patent
Bohm

(10) Patent No.: US 8,130,124 B2
(45) Date of Patent: Mar. 6, 2012

(54) METHOD AND APPARATUS FOR IMPROVING THE RELIABILITY OF A SERIAL LINK USING SCRAMBLERS

(75) Inventor: Christian Willibald Bohm, Rattenberg (DE)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 12/562,244

(22) Filed: Sep. 18, 2009

(65) Prior Publication Data
US 2010/0322340 A1 Dec. 23, 2010

Related U.S. Application Data

(60) Provisional application No. 61/218,509, filed on Jun. 19, 2009.

(51) Int. Cl.
*H03M 7/00* (2006.01)
(52) U.S. Cl. ............................................. 341/59; 341/58
(58) Field of Classification Search .................. 341/50, 341/58, 59, 100, 101
See application file for complete search history.

(56) References Cited

U.S. PATENT DOCUMENTS

| | | | | |
|---|---|---|---|---|
| 4,782,488 A | * | 11/1988 | Anderson | 713/190 |
| 5,561,714 A | | 10/1996 | Hershberger | |
| 5,606,317 A | * | 2/1997 | Cloonan et al. | 341/58 |
| 5,892,467 A | * | 4/1999 | Kim | 341/59 |
| 6,052,072 A | * | 4/2000 | Tsang et al. | 341/59 |
| 6,359,930 B1 | * | 3/2002 | Nakagawa et al. | 375/253 |
| 7,263,152 B2 | | 8/2007 | Miller et al. | |
| 7,321,697 B2 | * | 1/2008 | Sudharsanan et al. | 382/244 |
| 7,391,836 B2 | | 6/2008 | Miller et al. | |
| 7,460,786 B2 | | 12/2008 | Miller et al. | |
| 7,617,064 B2 | | 11/2009 | Stakely et al. | |
| 7,684,437 B2 | | 3/2010 | Miller et al. | |
| 7,702,059 B2 | | 4/2010 | Miller et al. | |
| 7,742,438 B1 | | 6/2010 | Sheafor et al. | |
| 7,793,022 B2 | | 9/2010 | Travers et al. | |
| 2004/0263941 A1 | | 12/2004 | Chen et al. | |
| 2006/0209892 A1 | | 9/2006 | MacMullan et al. | |
| 2006/0280055 A1 | | 12/2006 | Miller et al. | |
| 2008/0247414 A1 | | 10/2008 | Sheafor et al. | |
| 2008/0250175 A1 | | 10/2008 | Sheafor et al. | |
| 2009/0022176 A1 | | 1/2009 | Nguyen | |
| 2009/0083825 A1 | | 3/2009 | Miller et al. | |
| 2009/0103727 A1 | * | 4/2009 | Heywood et al. | 380/210 |
| 2009/0260043 A1 | | 10/2009 | Tatsuta et al. | |
| 2010/0023825 A1 | | 1/2010 | Stakely et al. | |
| 2010/0194966 A1 | | 8/2010 | Abe | |

* cited by examiner

OTHER PUBLICATIONS

Pohlmann, Ken C., "The Compact Disc System", The Compact Disc Handbook, 2nd Ed., 1992, pp. 47-101, A-R Editions, Inc.

*Primary Examiner* — Peguy Jean Pierre
(74) *Attorney, Agent, or Firm* — Kenyon & Kenyon LLP

(57) ABSTRACT

Embodiments provide for a method for eliminating pathological sequences in a serial bit stream. Parallel data words having a first bit length are received. The received data words may be analyzed for a pathological sequence. If a pathological sequence is present in a data word, the data word containing the pathological sequence may be segmented into data segments having bit lengths less than a pathological sequence. The data word may be reformatted by generating reformatted data words having a second bit length. The reformatted data words may contain at least one of the data segments and the second bit length is greater than the first bit length. The reformatting may be performed by adding framing bits to the segments to form the reformatted data words. The reformatted data words are transmitted in place of the data word containing the pathological sequence.

18 Claims, 4 Drawing Sheets

METHOD AND APPARATUS FOR IMPROVING THE RELIABILITY OF A SERIAL LINK USING SCRAMBLERS

This application claims the benefit of U.S. Provisional Patent Application Ser. No. 61/218,509 filed on Jun. 19, 2009, the entire contents of which are incorporated herein by reference.

BACKGROUND

High speed serial data interfaces are often used to serially transfer large amounts of data between devices. The serial data streams are typically generated and received by so-called 'SerDes' devices (Serializer/Deserializer). A serializer takes a parallel data stream and a clock, and outputs the data in a single (serial) bit stream. The rate of the serial data stream is equivalent to the input clock frequency multiplied by the bit width of the parallel stream. The high speed serial output of the serializer can typically is transmitted over a distance to a receiver. Only the single bit stream needs to be transferred, as the clock used to generate the data stream is embedded in the serial data flow. On the receive side, a deserializer converts the serial data stream into a parallel data stream. From the high-to-low and low-to-high transitions in the serial data stream, a phase locked loop (PLL) circuit coupled with the deserializer attempts to recover the clock. Once locked, a PLL clock can then be used to feed the serial data into a shift register from which it can be read out in a parallel fashion.

The PLL can only recover the clock if there are an adequate number of data transitions contained in the digital stream. Therefore, the data to be transmitted must have a certain number of minimum transitions, otherwise the receive PLL cannot lock onto the incoming data to recover the clock. For data words which do not have the required minimum number of data transitions, the term 'pathological sequence' can be used. For example, a pathological sequence may have 5 to 10 consecutive identical digits (CID) as data bits. The actual number of CIDs that can cause loss of lock in a PLL is typically dependent on the constraints of the PLL. Occasional occurrences of pathological sequences may lead to a frequency drift in the recovery PLL and cause bit errors. A larger number of pathological sequences can lead to the receive PLL completely losing lock.

A common way to ensure that no pathological sequences are fed into the SerDes is to use 8b/10b encoding. The data that is to be transmitted has a bit width of 8 bits. The SerDes is configured to accept 10 bits of parallel data. The two additional bits add 'redundancy' to the original 8 bits of data. The additional 2 bits are used to insure that even continuous streams of logic zeros (or logic ones) on the encoders input are broken up. In other words, the additional two bits can be set to the inverse of their predecessor, thus forcing a certain number of minimum transitions into the SerDes. However, the downside of this algorithm is that it takes 20% of the bandwidth. The SerDes bandwidth is proportional to the 10 bits at its input. The actually usable data range within the 10 bits is only 8 bits.

An alternative way to attempt to avoid pathological sequences is to use a scrambling algorithm. Most of the scrambling algorithms are based on LFSR (linear feed back shift register) architectures. These scramblers take the arbitrary input data and modulate it with a known, pseudo random number sequence. This decreases the chances of an unacceptable string of consecutive identical digits dramatically due to the pseudo random nature of the modulating signal. An example of such a system used in video transmission is the Society of Motion Picture and Television Engineers (SMPTE) scrambler as specified in SMPTE 259M.

While the use of scramblers such as the SMPTE 259M substantially decreases the number of pathological sequences, they can not avoid them completely. This is due to the fact that the bit width on the input to the scrambler is the same as on the output of the scrambler and there are no reserved codes or other redundancy built in. Hence, pathological sequences can only be spread over time but they can not be transcoded into safe codes. Whether or not a serial transmission system can actually deal with pathological sequences depends on a number of parameters. Even the use of a scrambler does not guarantee that a pathological sequence will not occur. Given the application of the SMPTE 259M standard to high-definition television where even a brief loss of lock by the PLL can result in a negative viewing experience for the viewer, a more reliable data stream would be beneficial.

DETAILED DESCRIPTION

Figure 1:
FIG. 1 illustrates an exemplary system for transmitting serial data using a scrambler as a preprocessor.

Exemplary embodiments provide for method for minimizing the occurrences of pathological sequences in a serial bit stream. Data words having a first bit length may be received. The received data words may be analyzed for occurrences of a pathological sequence, where a pathological sequence may be a predetermined number of consecutive identical bits. If a pathological sequence is present in one or more data words, the one or more data words containing the pathological sequence may be segmented into data segments having bit lengths less than a pathological sequence. The one or more data words may be reformatted to eliminate the pathological sequence by generating reformatted data words having a second bit length. The reformatted data words may contain at least one of the data segments and the second bit length is greater than the first bit length. The reformatting may be performed by adding known framing bits to the segments in the data words to form the reformatted data words. The reformatted data words may be transmitted in place of the one or more data words containing the pathological sequence.

Embodiments provide a system for eliminating the occurrences of a pathological sequence includes a parallel data bit scrambler, a pathological sequence detector and a serializer. The parallel data bit scrambler may scramble the bits of an input parallel data word according to a scrambling algorithm to generate an original scrambled parallel data word. The scrambled parallel data word may have a first bit length. The pathological sequence detector may detect an occurrence of a pathological sequence within the original scrambled parallel data word. Based on a signal received from the pathological sequence detector, the reformatter may reformat the original scrambled parallel data word into a reformatted data word having a second bit length. The second bit length may be greater than the first bit length. The serializer may serialize the reformatted data word into a serial bit stream.

Exemplary embodiments provide for a method for minimizing the occurrences of pathological sequences in an encoded serial bit stream. The encoded bit stream may be transmitted in data words having a known bit length. The transmitted data word may be analyzed at a receiver. If a pathological sequence is detected, the pathological sequence may be reformatted by segmenting the data word containing the pathological sequence. New reformatted data words containing at least one of the segments of the pathological sequence data word may be generated. During reformatting, known framing bits may be added to the segments in the data words to form the reformatted data words. The reformatted data words may be transmitted in place of the data word containing the pathological sequence. On the receiver side, when the serial data is de-serialized, it may be determined whether the data word is a reformatted data word, the receiver may strip away the known framing bits and the data of the pathological sequence may be reconstructed. The reconstructed data may be output, which can be to storage device, a display device, and/or an audio device.

FIG. 1 illustrates a system for transmitting serial data. An exemplary system 100 includes a preprocessor 110, a serializer 120 and a transmitter 130. Parallel data having, for example, N bits, can be input into the system 100. The N bits of parallel data can be preprocessed by preprocessor 110. The preprocessor 110 can scramble, i.e., change, some or all of the N bits of parallel data according to a known scrambling algorithm, such as SMPTE 259M. The purpose of the scrambling is to minimize the number of occurrences of a pathological sequence, which may cause in which the phase locked loop within the receiving deserializer to lose lock. However, even though the data bits are scrambled, pathological sequences still occur. The preprocessed parallel data, or, in other words, the "payload", is input into the serializer 120. The serializer 120 outputs the parallel data payload in a serial data format to the transmitter 130. The transmitter 130 may convert the serial data into a format suitable for transmission over a wireless, wired, optical or any other type of communication medium. The serial data may be transmitted in a continuous stream by the transmitter 130.

On the receive side (not shown), the process is reversed. A receiver receives the continuous serial data stream from the communication medium. A deserializer (not shown), the complement to serializer 120, converts the serial data stream into a parallel format. A post-processor (not shown), the complement to the preprocessor 110, descrambles the data to restore the original data content.

Figure 1A:
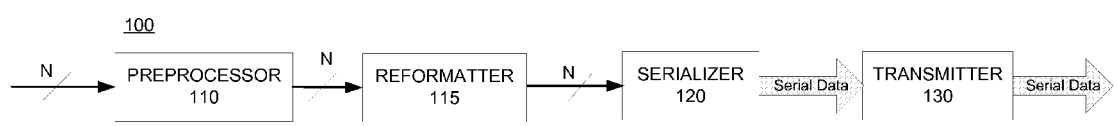
FIG. 1A illustrates an exemplary embodiment of the function of the scrambler

FIG. 1A illustrates an exemplary embodiment that maintains the function of the scrambler while eliminating the occurrence of pathological sequences in the scrambled data. The components illustrated in FIG. 1A having similar component numbers as those in FIG. 1 perform the same function as those described in FIG. 1.

In system 100A, after preprocessor 110 is a reformatter 115. The reformatter 115 detects the presence of pathological sequences (PS), and takes corrective action to prevent the PS from entering the serializer 120. An extra bit may be added to the data word to indicate that the corrective action was performed. For example, a data word may have N bits, where N equals approximately 17, and may output from reformatter 115, a data word that may have M bits, where M equals approximately 18. Of course, the bit numbers M and N can be any bit length (e.g. 20 and 19, respectively) where the number of bits M is greater than N. The exemplary operation of reformatter 115 will be explained with respect to FIG. 2.

Figure 2:
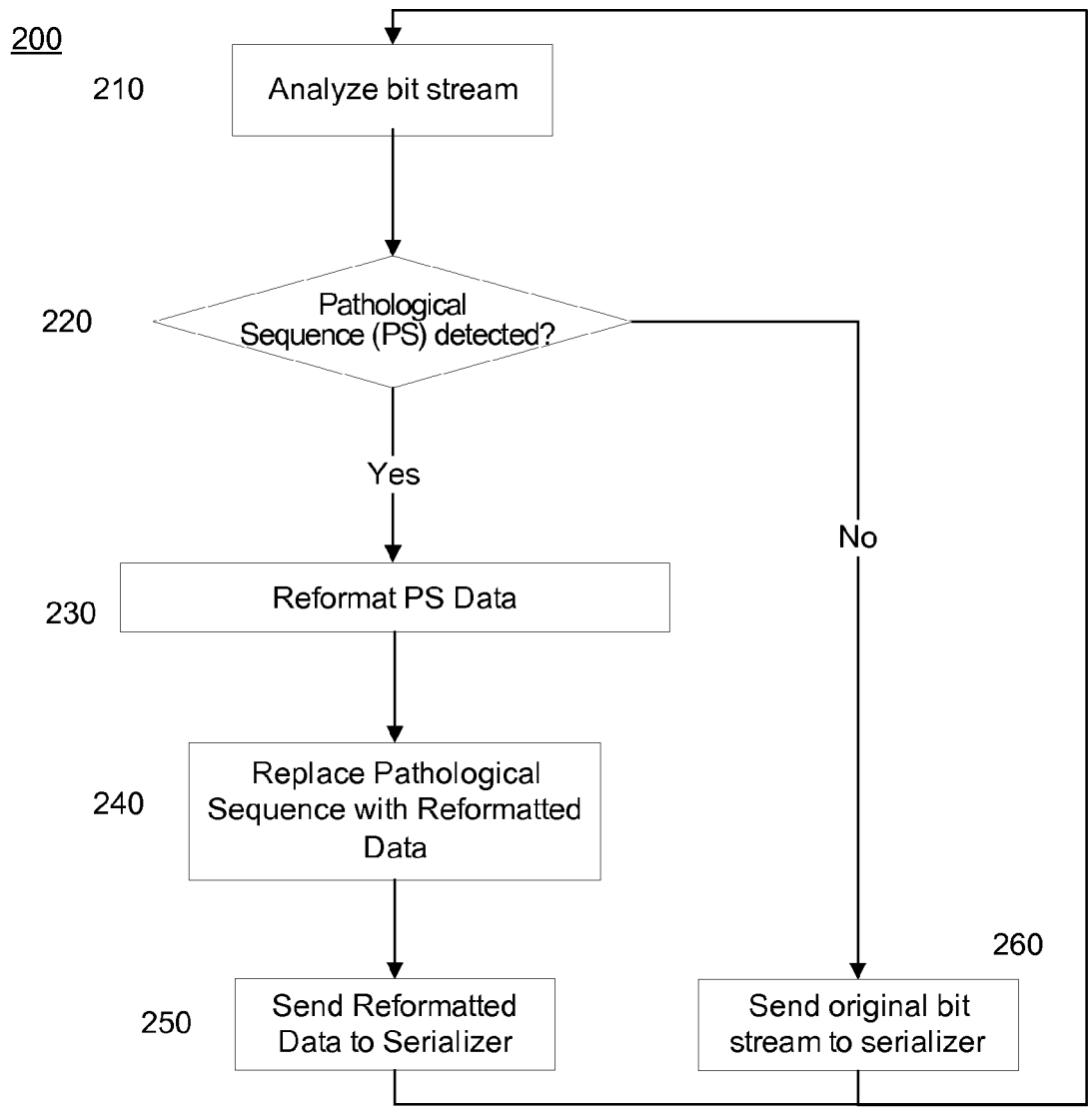
FIG. 2 describes an exemplary method for detecting a pathological sequence according to an embodiment of the present invention.

FIG. 2 describes an exemplary method for compensating for a pathological sequence according to an embodiment of the present invention.

The exemplary process 200 determines if a pathological sequence is present and compensates for the pathological sequence as follows. A parallel bit stream, at 210, is analyzed for the occurrence of pathological sequences. As explained above, a pathological sequence is a bit sequence that has a consecutive number of identical bit values, or consecutive identical digits (CID), such as 11111111 or 00000000. The consecutive number of identical bits that can be handled by a phase locked loop (PLL) in a deserializer circuit may depend upon various factors, such as the type of PLL, the loop bandwidth of the PLL, the physical parameters of the electronics and the system set-up, e.g. user settings of external components. During the transmission of a long run of CIDs, the receiving PLL may lose lock due to the lack of clock edge (data transition) updates. The CIDs may be present within a single data word or may spread across the boundaries of two consecutive data words. The number of CIDs that constitute an occurrence of a pathological sequence may be dependent upon the hardware and/or software used in the system, such as for a PLL.

An example of a process to detect both types of occurrences of CIDs (single word and overlapping words) is to analyze two consecutive words (e.g., 2×N bits) simultaneously in a pipelined fashion. If a pathological sequence is NOT detected at 220, the data is transmitted in its original format as shown in block 260. The system may return to analyze the data stream at 210, and the serializer processes the data in a conventional manner.

However, if a pathological sequence is detected, the process 200 may send the data with the pathological sequence (PS) for reformatting at 230. In addition, a signal can be sent to inform the reformatting processes that a pathological sequence has been detected.

A pathological sequence can be detected using a number of configurations of digital logic. For example, adjacent pairs of bits in the parallel data word(s) may be input into a plurality of Exclusive-NOR gates, the output of which is input into an AND gate. If the latter outputs a high (or a logic 1); then the data word contains a pathological sequence. Any digital logic that is capable of indicating that consecutive bits are identical may be used to detect a pathological sequence.

The requirements of the Serializer/Deserializer (SerDes) combination can determine how many CIDs may be tolerated. Some systems today may consider a run length of seven (7) consecutive identical digits as a pathological sequence. A SerDes device with other parameters may tolerate longer CID runs, or may only accept shorter CID runs. The detection hardware or software that participates at step 220 may be constructed in such a way that it detects CID runs which exceed the maximum allowed number of consecutive identical digits for a particular SerDes combination used in the system.

When a pathological sequence is detected, the data word(s) containing the pathological sequence may be reformatted at 230. In an exemplary embodiment, the data word containing the pathological sequence may be segmented into a predetermined number of bit groups, such as 4. The predetermined number of bit groups may be framed with framing bits to build at least 2 new reformatted data words (as explained in more detail with reference to FIG. 3). One of the framing bits, or an additional bit, may be a bit indicating to downstream devices or processes that the data word contains a pathological sequence. The framing bits may also be control bits that are used to indicate another condition, update status, and issue a command to another device or the like. Reformatted data words including bit groups and framing bits are generated.

Figure 3:
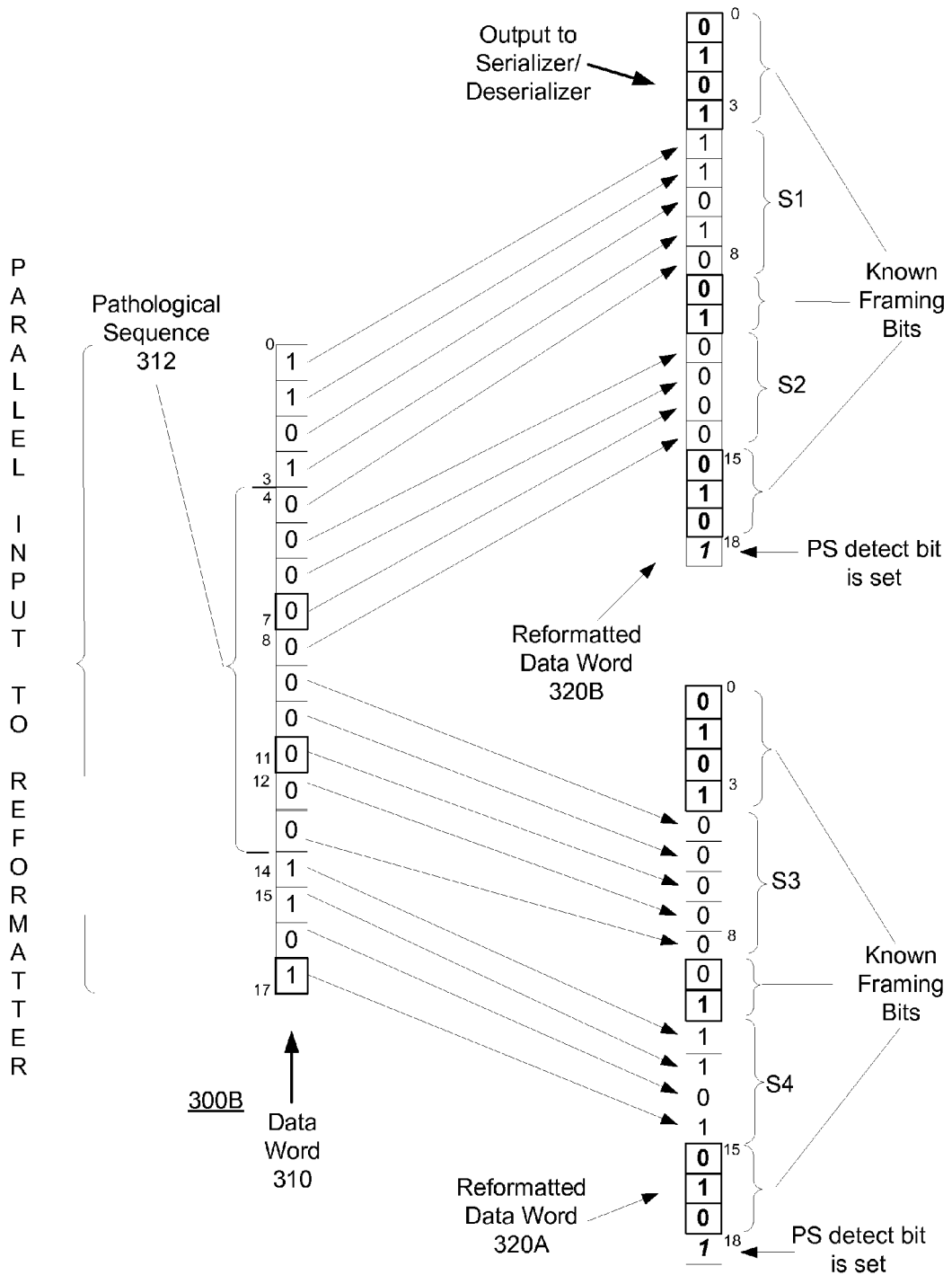
FIG. 3 describes the use of framing bits according to an embodiment of the present invention.

Based on whether the pathological sequence is formed from consecutive 1s or 0s can determine the values of the framing bits and the order of the framing bits. Exemplary reformatted data words are illustrated in FIG. 3. The reformatted data word(s) can be inserted into the parallel bit stream to replace the data word(s) containing the pathological sequence at 240. The reformatted data word(s) can be reinserted into the parallel bit stream at the same position previously containing the pathological sequence.

The reformatted data word(s) is sent to a serializer for serialization at 250.

As explained briefly above, once a pathological sequence is detected, it is reformatted into a data word having a minimal number of CIDs such that the reformatted data word does become a pathological sequence. An example of reformatting will be described in more detail with respect to FIG. 3. FIG. 3 illustrates the reformatting 300 of a data word 310 with a pathological sequence 312 into reformatted data words 320A and 320B.

Data word 310 can have a sequence of consecutive identical bits, such as the 10 consecutive bits with a zero (0) bit value as shown in FIG. 3. In the present example, sequence 312 may be a pathological sequence. An exemplary reformatting process 300 of data word 310 can include segmenting the entire data word 310 or payload including the pathological sequence 312 into a plurality of sections (bit groups). In the example of FIG. 3, the data word 310 is segmented into four (4) sections (S1, S2, S3, and S4).

The exemplary sections S1, S2, S3, and S4 can have differing bit lengths of 5, 5, 4 and 4 (starting from the least significant bit position 0), respectively.

Of course, more or less sections can be chosen, four (4) sections were chosen for ease of explanation and illustration. Furthermore, the sections S1, S2, S3, and S4 can be of varying, different bit lengths or the same bit lengths instead of the exemplary 5, 5, 4 and 4 bit lengths.

In the reformatting process 300, known framing bits (e.g., 0101, 01, and 010) can be inserted at bit positions 0-3, 9, 10, 15-18 in a first reformatted data word, and in a second reformatted data word known framing bits can be inserted at bit positions 0-3, 9, 10, and 15-18. Of course, other bit positions may be chosen for the known framing bits.

Note the framing bits can be limited to runs of consecutive bits less than 2 bits to avoid creating another pathological sequence in the reformatted data word 320A or 320B. The framing bits can be spaced so when a section of a data word 310 that was part of the pathological sequence 312 is copied into the reformatted data words (320A or 320B), it does not create another pathological sequence in the reformatted data words 320A or 320B. For example, when the pathological sequence 312 is formed from all zeroes (0) in reformatted data word 320A, bits 0-3 alternate and end in zero (0), while the middle framing bits at bit positions nine (9) and ten (10) also alternate but with a zero (0) in bit position 9 and a one (1) in bit position 10.

In addition, the framing bits do not have to be fixed but may be adaptive based on the data in the pathological sequence. The framing bits may also contain data indicating a condition, such as an end of data indication or an indication that another pathological sequence has been detected. Of course, other framing bits and combinations thereof can be used. Data words of, for example, 19/20 bits can be used to accommodate the currently available hardware.

Figure 4:
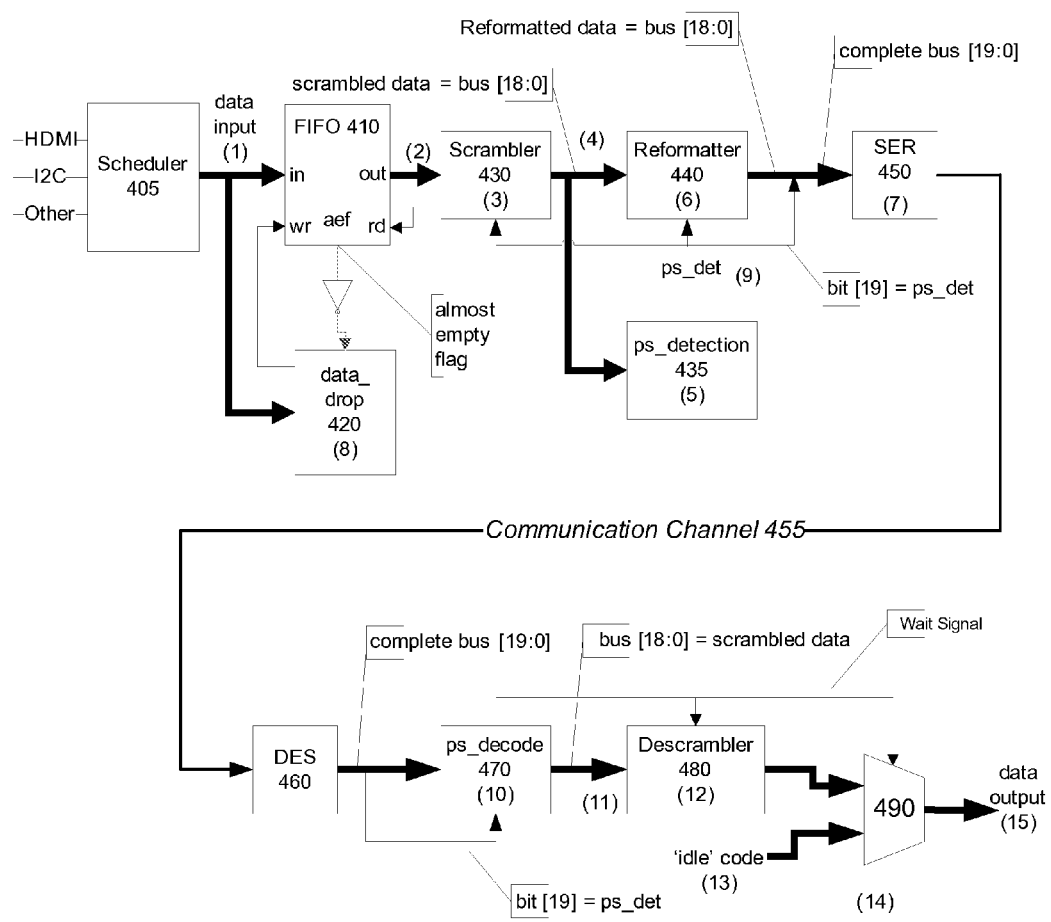
FIG. 4 illustrates a block diagram according to an exemplary embodiment of the present invention.

FIG. 4 illustrates a block diagram according to an exemplary embodiment of the invention.

The exemplary system 400 can include a scheduler 405, a register 410, a data drop processor 420, a scrambler 430, a reformatter 440, a pathological sequence (PS) detector 435, a serializer 450, a serial communication path 455, a deserializer 460, a pathological sequence (PS) decoder 470, a descrambler 480 and a multiplexer 490.

The scheduler 405 is optional, and has inputs and outputs. Scheduler 405 may provide video, audio and control data (e.g. HDMI, I2C and other) in the form of data words to the register 410 and to the data drop analyzer 420. Of course, any other type of data can be transmitted using the same system setup.

The register 410 buffers data words received from the scheduler 405, and provides the data words in a first-in-first-out manner to the scrambler 430. The register 410 may have an output indicating register status, such as the register is almost empty or full, and inputs for reading and writing, so the register can shift data words out and in, respectively.

The data drop processor 420 may have an input for monitoring data words as they are passed from the scheduler 405 to the register 410, an input for receiving register status signals, and an output for signaling the Register 410 to whether to write the data from the scheduler 405 into memory or to discard it.

The scrambler 430 may have an input for receiving data words from the register 410, an input for receiving a signal indicating the presence of a pathological sequence, and an output to register 410 to indicate a data read operation. The register 410 may output data words in which the bits are scrambled to a pathological sequence (PS) detector 435, and a reformatter 440.

The scrambler 430 can further encode the bits in the data words to add further variation in the data sequences forming the encoded data words. The scrambler 430 may be an SMPTE 259M device as known in the art.

The pathological sequence (PS) detector 435 may have an input for receiving the scrambled data words from the scrambler 430, and an output for transmitting a signal indicating the presence of a pathological sequence based on an analysis of the scrambled data words output of the scrambler 430.

As explained above, the PS detector 435 can be implemented using exclusive-NOR gates. Of course, other digital logic or techniques can be used to detect a pathological sequence. The PS detector 435 may add a bit to the data word indicating the presence or absence of a pathological sequence.

The reformatter 440 may have plural inputs for receiving the parallel, scrambled data words from the scrambler 430, an input for receiving a control signal from the PS detector 435, and plural outputs to a serializer 450. In response to an indication that a pathological sequence (PS) has been detected, the reformatter 440 may include circuitry for manipulating the data word received from the scrambler 430 to reformat the data word to compensate for the pathological sequence. In absence of an indication of the detection of a pathological sequence, the parallel data in the data word is passed unaltered through the reformatter 440.

In an alternative embodiment, the reformatter 440 may add a bit to the data word indicating the presence or absence of a pathological sequence instead of adding the bit at the PS detector 435.

The serializer 450 has a plurality inputs for receiving the parallel data of the encoded data words from reformatter 440, and an input for a signal from PS detector 435, and an output for outputting a serialized bit stream. Of course, the serializer 450 may also perform the functions of a deserializer.

The communication channel 455 can be any communication medium, such as a fiber optic cable, a coaxial cable, wireless communication link or any other suitable communication medium. The communication channel 455 transports the serialized bit stream output from serializer 450 to deserializer 460, and any other data back.

The deserializer 460 has an input for receiving the serial data from the communication channel 455, and an output to a PS decoder 470. The deserializer 460 deserializes the serial data according to known techniques and provides parallel data to the PS decoder 470 for processing. Of course, the deserializer 460 may also perform the functions of a serializer.

The PS decoder 470 has inputs for receiving the parallel bit stream output from the deserializer 460, an output for indicating to the scrambler 480 and the multiplexer 490 that a pathological sequence needs to be decoded, and outputs for outputting a parallel bit stream. The PS decoder 470 also includes circuitry for detecting whether the data word includes a pathological sequence, for stripping away the framing bits added by the reformatter 440, and outputting a data word with a pathological sequence matching the data word with the pathological sequence output from the scrambler 430.

The descrambler 480 has an input for receiving data from the PS decoder 470, an input for receiving an indication that the PS decoder 470 is processing words generated by the reformatter 440 due to the presence of a pathological sequence, and an output for outputting the descrambled data word to a multiplexer 490. Descrambler 480 has circuitry for descrambling the encoded data.

The multiplexer 490 has plural inputs for receiving control signals indicating that the PS decoder 470 is decoding a pathological sequence, the parallel video data word from the descrambler 480 and for receiving an idle data word to compensate for delays due to the decoding of any pathological sequences. The multiplexer 490 also has an output for outputting encoded data to a decoder of an output device such as a television, a computer monitor or an audio device.

The optional scheduler 405 receives video, audio and/or other data. Of course, any other type of data (e.g., control data or encryption key data) can be processed. The output of scheduler 405 is made up of payload data (e.g. video, audio and/or other data) and dummy words. The total number of payload data bytes must not fill the bandwidth of the serializer 450 completely. The reserve bandwidth is filled with dummy values. These dummy values form 'redundant data' which does not need to be transmitted, but can be re-created in form of 'idle codes' on the receive side via the multiplexer 490. The sum of the number of dummy values and the number of payload data bytes must be equal to exactly the bandwidth of the Serializer (450), communication channel (455) and deserializer (460). Dummy values can be marked by special bit information from the scheduler 405. The dummy values may also be formed by means of a reserved value within the output of scheduler 405. Upon scheduling the received data for output, the scheduler 405 may output the data for delivery via the system 400.

The scheduled data is output to a register 410. The register 410 may be a first-in-first-out register that may buffer the data for output to the scrambler 430. The register 410 can also set a flag when a minimum threshold of data buffered in the register is reached.

With no pathological sequences present in the output of scheduler 405, the register 410 will always only be filled with a minimum number (e.g. 1) of data values. This is because the rate of writing into the register may be equal to the rate at which the scrambler 430 reads from it.

With pathological sequences present in the output of the scheduler 405, the reformatter 440 further down the data path will need to replace the offending data word(s) containing the pathological sequence with two or more reformatted data words, thus creating a backlog of data in the register 410. The register 410 will buffer up the output of the scheduler 405.

If a backlog of data has built up inside the register 410, the data drop analyzer 420 will examine the output of the scheduler 405. If the data drop analyzer finds that a dummy value is presented to the register 410, it will instruct the register 410 not to store this value. This will cause the backlog in register 410 to decrease by one.

The flag (almost empty flag, AEF) is set, for example, HIGH (logic 1), when the register 410 is almost empty. The logic HIGH is output from the register 410, is inverted by an inverter, and the logic LOW is input to the data drop processor 420. The data drop processor 420 in response to the low signal may not indicate to the register 410 to drop any data words.

Conversely, when the AEF is LOW (logic 0), the data drop processor 420 may indicate that the register is above the minimum threshold for data. In this case, the inverter inverts the logic LOW to a logic HIGH to which the data drop processor 420 responds by finding dummy values within the output of scheduler 405. If the output of scheduler 405 contains a dummy word (e.g., redundant data) the data drop processor 420 may indicate to the register 410 that this particular dummy data word should be dropped.

When the scrambler 430 needs further data to scramble, the scrambler 430 reads the data from the register 410, and scrambles the data according to known techniques in an attempt to insure that the data has enough variations to allow the phase locked loop of the deserializer 460 to maintain phase locked on the clock data.

The scrambled data output from the scrambler 430 can be monitored by the pathological sequence (PS) detector 435 to identify any pathological sequences that may have been output from the scrambler 430.

If a pathological sequence has been output from the scrambler, the PS detector 435 outputs an indication of a pathological sequence has been detected to the scrambler 430 and to the reformatter 440.

The data output from the scrambler 430 is also input to reformatter 440. The indication can also be embedded as an extra bit in the bit stream to indicate either the presence or the absence of a pathological sequence to downstream devices in the data word.

If no indication of a pathological sequence is received by the reformatter 440 from the PS detector 435, the reformatter 440 can add a bit (e.g., a logic zero) to the data word indicating the absence of a pathological sequence in the data word.

If there is an indication of a pathological sequence from the PS detector 435, the reformatter 440 segments the data word containing the pathological sequence into a plurality of bit groups. The bit groups have fewer data bits than the data word, and are smaller than the threshold for the number of consecutive identical digits that can be processed by the phase locked loop of the deserializer 460. The reformatter 440 also can add a bit (e.g., a logic one) to the reformatted data word(s) indicating a reformatted data word.

The data word(s) is reformatted by surrounding the bit groups with framing bits that can be of known variations as described above with respect to FIG. 2. For example, framing bits can always be inserted in the same bit locations in a data word, such as bit positions, 0-2, 10-12 or 7-11.

The reformatter 440 can generate, for example, two 19-bit data words from the plurality of smaller data segments, and output the two 19-bit reformatted data words for processing by the serializer 450.

The read signal output by the scrambler 430 can be delayed in response to the pathological sequence detected signal output by the PS detector 435.

The serializer 450 may receive on its inputs the N-bits, where, for example, N=18, of parallel data from the reformatter 440 and a bit (which can be called a "ps_detect" bit) from the PS detector 435. The inputs to the serializer 450 receive 19-bits of parallel data. The serializer 450 may serialize the first data word generated by the reformatter 440 and then the second, or vice versa. The serializer 450 may serialize the output of the reformatter 440 in a known manner, and transmit the data to deserializer 460 via the communication channel 455.

At deserializer 460, the serialized data is deserialized into 19-bits of parallel data.

After the deserializer 460, the parallel data is analyzed to determine if reformatted data words are present. The "ps_detect" bit may indicate that reformatted data is received. In which case, 18 bits of parallel data may be decoding by decoder 470. If, for example, the "ps_detect" bit is high (logic 1) that may indicate that the data word has been generated by the reformatter 440, and the original scrambled data contained a pathological sequence. If reformatted data is indicated, the decoder 470 begins to strip away the framing bits from the known framing bit locations.

The decoder 470 may send a signal indicating to the descrambler 480 and multiplexer 490 that a delay is going to result from the decoding of the generated data word from the reformatter 440. The decoder 470 may output a wait signal indicating the need for descrambler 480 and MUX 490 to wait for decoder 470 to decode the reformatted data word. The decoder 470 may put the consecutive identical data bits segmented by the reformatter 440 back in their proper order, to form the original data word output by the scrambler 440, and outputs the one decoded scrambled data word to the descrambler 480.

The descrambler 480 begins to descramble the data word(s) output by the decoder 470. While the system 400 waits for the decoder 470 to process the reformatted data words generated by the reformatter 440, a dummy data word (e.g., redundant data) can be output by the multiplexer 490. When the descrambler 480 has finished descrambling the 18 bits of data, the unscrambled data may be output to the multiplexer 490 for distribution.

Conversely, at the receiver, if the data does not indicate the presence of reformatted data words. For example, when the "ps_detect" bit is low (a logic 0), the 18 bits of data may be passed through the decoder 470, and sent directly to descrambler 480 for descrambling. When the descrambler 480 has finished descrambling the 18 bits of data, the unscrambled data is output to the multiplexer 490 for distribution.

The disclosed system and process may be implemented is an ASIC or other circuit implementation that may be part of a source device (e.g., DVD player) and/or a sink device (e.g., television and/or audio playback device), a cable implementation for connecting a source device to a sink device, or other implementations. The process instructions may be stored in a machine-readable storage media, such as a hard disc drive, non-volatile memory, firmware, and the like, for execution by a processor or other form of machine.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

I claim:

1. A method for minimizing the occurrences of pathological sequences in a serial bit stream, comprising:
    receiving data words having a first bit length;
    analyzing the received data words for occurrences of a pathological sequence, a pathological sequence being a predetermined number of consecutive identical bits;
    if a pathological sequence is detected to occur in a data word, reformatting the respective data word to eliminate the pathological sequence by:
        segmenting the respective data word containing the pathological sequence into data segments having bit lengths less than a length of a pathological sequence;
        adding framing bits to the segments in the data words to form the reformatted data words having states different than a path sequence; and
        transmitting the reformatted data words in place of the data word containing the pathological sequence, wherein the reformatted data word includes a bit to indicate that the data word has been reformatted to eliminate a pathological sequence.

2. The method of claim 1, wherein the adding comprises:
    positioning the known framing bits in predetermined bit positions within the data word to separate a first data segment from a second data segment.

3. The method of claim 1, comprising:
    if a pathological sequence is found absent from the data word, adding a bit indicator to the data word indicating the absence of a pathological sequence.

4. The method of claim 1, wherein the analyzing the received data words for occurrences of a pathological sequence comprises:
    analyzing two consecutive data words to detect an occurrence of a pathological sequence in each data word and an occurrence of a pathological sequence that overlaps from a first of the two consecutive data words to a second of the two consecutive data words.

5. The method of claim 1, wherein the received data word is received from a data scrambler.

6. The method of claim 1, wherein the pathological sequence is determined to occur in overlapping data words, and the reformatting is performed on the overlapping data words.

7. A method of decoding an encoded serial bit stream configured to minimize the occurrences of a pathological sequence, comprising:
    deserializing a serial bit stream into individual parallel data words;
    analyzing the bits of the individual data words to determine if the parallel data word contains a segment of an encoded data word that contained a pathological sequence;
    based on the results of the analysis of the bits, removing known framing bits from predetermined bit positions within the individual data words to leave remaining a segment of an encoded data word that contains the pathological sequence; and
    reconstructing a data word that contains the pathological sequence by using the remaining segment of the encoded data word.

8. A system for minimizing the occurrences of a pathological sequence, comprising:
- a pathological sequence detector for detecting an occurrence of a pathological sequence within an original parallel data word, the original data word having a first length;
- a reformatter for reformatting the original parallel data word based on a signal received from the pathological sequence detector into a plurality of reformatted data words, wherein each reformatted data word has a second length at least equal to the first length and the reformatted data word includes a bit to indicate that the data word has been reformatted to eliminate a pathological sequence; and
- a serializer for serializing the output of the reformatter into a serial bit stream.

9. The system of claim 8, further comprising:
- a communication medium for communicating the serialized output of the reformatter to a receiver, the receiver comprising:
  - a deserializer for deserializing the received data word;
  - a decoder for analyzing the bits of the deserialized data word to determine whether the data word contains reformatted data, wherein the decoder decodes the reformatted data word to reconstruct the original parallel data word.

10. The system of claim 9, further comprising:
- a descrambler for descrambling the original scrambled parallel data word to provide the input parallel data word for output from the receiver.

11. The system of claim 8, further comprising:
- a parallel data bit scrambler for scrambling the bits of an input parallel data word according to a scrambling algorithm to generate an original scrambled parallel data word, where the scrambled parallel data word has a first bit length and having an output connected to the pathological sequence detector.

12. A method for minimizing the occurrences of pathological sequences in a serial bit stream, comprising:
- receiving data words having a first bit length;
- analyzing the received data words for occurrences of a pathological sequence, a pathological sequence being a predetermined number of consecutive identical bits;
- if a pathological sequence is detected to occur in a data word, reformatting the respective data word to eliminate the pathological sequence by:
  - segmenting the respective data word containing the pathological sequence into data segments having bit lengths less than a length of a pathological sequence;
  - adding framing bits to the segments in the data words to form the reformatted data words having states different than a path sequence;
  - transmitting the reformatted data words in place of the data word containing the pathological sequence; and
- if a pathological sequence is found absent from the data word, adding a bit indicator to the data word indicating the absence of a pathological sequence.

13. The method of claim 12, wherein if a pathological sequence is detected, the reformatted data word includes a bit to indicate that the data word has been reformatted to eliminate a pathological sequence.

14. A machine-readable storage medium embodied with program instructions for causing a processor to execute the steps of:
- receiving data words having a first bit length;
- analyzing the received data words for occurrences of a pathological sequence, a pathological sequence being a predetermined number of consecutive identical bits;
- if a pathological sequence is detected to occur in a data word, reformatting the respective data word to eliminate the pathological sequence by:
  - segmenting the respective data word containing the pathological sequence into data segments having bit lengths less than a length of a pathological sequence;
  - adding framing bits to the segments in the data words to form the reformatted data words having states different than a path sequence; and
  - transmitting the reformatted data words in place of the data word containing the pathological sequence, wherein the reformatted data word includes a bit to indicate that the data word has been reformatted to eliminate a pathological sequence.

15. A system for minimizing the occurrences of a pathological sequence, comprising:
- a pathological sequence detector for detecting an occurrence of a pathological sequence within an original parallel data word, the original data word having a first length;
- a reformatter for reformatting the original parallel data word based on a signal received from the pathological sequence detector into a plurality of reformatted data words, wherein each reformatted data word has a second length at least equal to the first length and if a pathological sequence is found absent from the data word, a bit indicator is added by the reformatter to the data word indicating the absence of a pathological sequence; and
- a serializer for serializing the output of the reformatter into a serial bit stream.

16. The system of claim 15, further comprising:
- a communication medium for communicating the serialized output of the reformatter to a receiver, the receiver comprising:
  - a deserializer for deserializing the received data word;
  - a decoder for analyzing the bits of the deserialized data word to determine whether the data word contains reformatted data, wherein the decoder decodes the reformatted data word to reconstruct the original parallel data word.

17. The system of claim 16, further comprising:
- a descrambler for descrambling the original scrambled parallel data word to provide the input parallel data word for output from the receiver.

18. The system of claim 15, further comprising:
- a parallel data bit scrambler for scrambling the bits of an input parallel data word according to a scrambling algorithm to generate an original scrambled parallel data word, where the scrambled parallel data word has a first bit length and having an output connected to the pathological sequence detector.

* * * * *